United States Patent [19]

Dighe

[11] 3,922,659
[45] Nov. 25, 1975

[54] POWER LINE FAULT INDICATING SYSTEM EMPLOYING A NEON LAMP OSCILLATOR

[75] Inventor: Kamalakar D. Dighe, Laurel, Md.

[73] Assignee: Baxter Laboratories, Inc., Deerfield, Ill.

[22] Filed: July 29, 1974

[21] Appl. No.: 492,657

[52] U.S. Cl. ............. 340/253 Q; 210/85; 210/321; 324/51; 340/255
[51] Int. Cl.² ........................................ G01R 31/02
[58] Field of Search ............... 324/51, 133, 127; 340/248 D, 253 Q, 255

[56] References Cited
UNITED STATES PATENTS

| | | | |
|---|---|---|---|
| 2,707,760 | 5/1955 | Sherman | 340/248 D X |
| 3,022,498 | 2/1962 | Alcott | 340/253 Q |
| 3,067,411 | 12/1962 | Dhimos | 340/253 Q X |
| 3,417,310 | 12/1968 | Hill | 340/248 D X |
| 3,771,049 | 11/1973 | Piccione | 324/127 X |
| 3,832,629 | 8/1974 | Cernek | 340/248 D X |

OTHER PUBLICATIONS
Tooker, Frank H., Battery-less Power Failure Alarm, Popular Electronics, Vol. 28, No. 2, Feb., 1968, pp. 43, 44.

Primary Examiner—Gerard R. Strecker
Attorney, Agent, or Firm—Herman L. Gordon; Richard G. Kinney

[57] ABSTRACT

A power line fault indicating system adapted to be connected in parallel with an electrical appliance for detecting the most common power line faults. The system employs a neon lamp connected in an R-C oscillator circuit which is controlled by circuitry responding to power line conditions to provide any one of three states of the lamp, namely, steady energization of the lamp, blinking of the lamp, or steady deenergization of the lamp, depending on different conditions. The circuitry includes a power supply stage, a logic stage, an averaging and delay stage, and a driver stage connected to a resistor forming part of the oscillator discharge circuit branch and arranged so as to short-circuit this resistor under normal power line circuit conditions and thereby allow the neon lamp to be steadily energized, and to remove the short circuit under certain abnormal power line conditions and thereby cause the oscillator to operate and provide blinking action of the lamp. Other abnormal power line conditions will prevent energization of the lamp.

13 Claims, 3 Drawing Figures

POWER LINE FAULT INDICATING SYSTEM EMPLOYING A NEON LAMP OSCILLATOR

This invention relates to electrical safety devices, and more particularly to devices for indicating line faults in electrical power supply systems.

A main object of the invention is to provide a novel and improved three-state indicating system for detecting power line faults, the indicating system being very simple in construction, being adapted to be easily connected in parallel with an electrical appliance, and requiring no other modification of said appliance.

A further object of the invention is to provide an improved three-state line fault indicator which is very compact in size, which involves relatively inexpensive components, and which provides reliable indications of a wide range of common power line faults.

A still further object of the invention is to provide an improved power line fault indicator which has a visual signal element and which can provide different indications representing either normal power line conditions, loss of power due to open phase or neutral supply lines or improper connections thereof, or more subtle power line faults.

A still further object of the invention is to provide an improved power line fault indicator of a type which can be connected in parallel with an electrical appliance, such as an artificial kidney machine, or the like, for fault monitoring, which has a neon lamp giving visual indications and which can be located either adjacent the appliance or can be remotely located, which employs a totally solid state system, and which, if so desired, may be employed to cut off the power to the appliance by controlling a power relay.

Further objects and advantages of the invention will become apparent from the following description and claims, and from the accompanying drawings, wherein:

A primary advantage of the present invention is that it delivers a minimum ground leakage current in performing its sensing function. When used in a dialysis, or artificial kidney machine which is connected to a patient's blood system, any leakage currents could be dangerous or even fatal to a patient with a heart condition.

Figure 1:
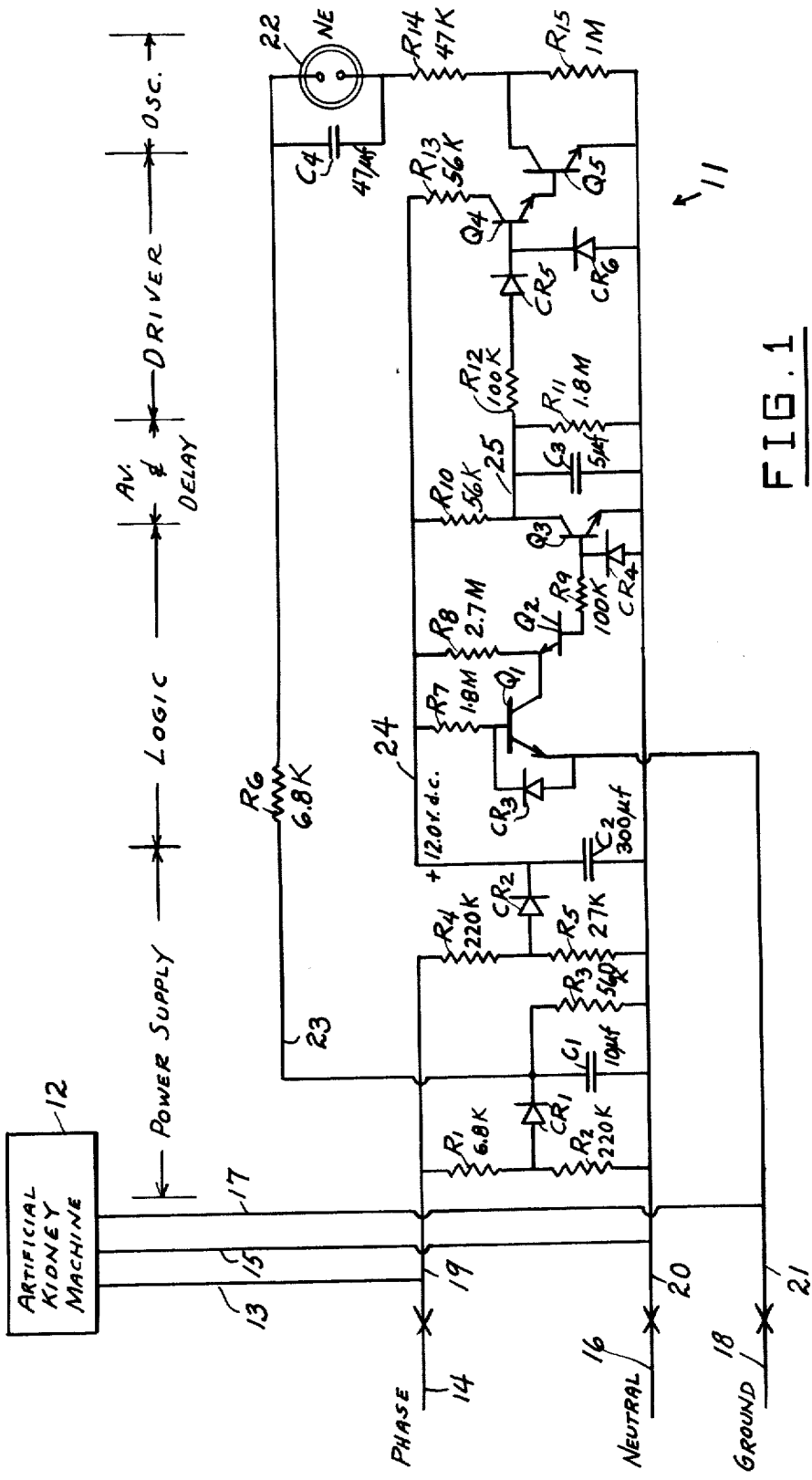
FIG. 1 is a wiring diagram showing an improved power line fault indicator according to the present invention connected in parallel with an artificial kidney machine.

Referring to the drawings, and more particularly to FIG. 1, 11 generally designates a typical embodiment of a power line fault indicating system according to the present invention, shown connected in parallel with an artificial kidney machine 12, which is a typical type of electrical appliance with which the system 11 can be employed.

The appliance 12 has a supply wire 13 intended to be connected to the phase voltage supply wire 14 ("hot" wire) of the power source, a neutral wire 15 intended to be connected to the neutral supply wire 16 of the power source, and a ground wire 17 intended to be connected to the grounded conductor 18 of the supply source. The fault indicating device 11 has respective input wires 19, 20 and 21 connected to the appliance supply conductors 13, 15 and 17. Conventional three-prong male plug means and cooperating socket means may be employed to connect the wires 19, 20 and 21 respectively to the supply line conductors 14, 16 and 18.

The fault indicating system 11, presently to be described in more detail, is provided with a neon indicating lamp 22 which may be located, with the remainder of the device 11, adjacent to or on the appliance 12, or alternatively, may be installed at a remote location.

The system 11 detects and indicates the following conditions: (a) if all the wiring is correct and no fault exists, the neon lamp 22 is "on"; (b) if there are one or more power supply line fault conditions of a certain type, the neon lamp 22 will blink at a steady rate. These fault conditions include the following:

1. Phase and neutral reversed.
2. Open ground.
3. High impedance in the ground wire.
4. High neutral voltage with respect to the ground wire.

(c) If other types of fault conditions exist, the neon lamp 22 will be "off". These other types include power line wiring errors such as to present the following results:

1. "Hot" supply line wire is connected to the system-appliance ground wire 21.
2. "Hot" supply line wire is connected to the system-appliance neutral wire 20 with the "phase" wire 14 open.
3. "Phase" wire 14 is open.
4. "Neutral" wire 16 is open.

While the device 11 to be further described herein is contemplated specifically as being a fault monitoring system and is not required to cut off the power to the appliance 12, if it is desired to achieve that protective function a logic signal point in the circuitry can be made available to drive a power relay.

Conditions "3" and "4" associated with the blinking indication are inter-related; thus, if it is desired to make the system sensitive to a lower ground impedance, the system would trigger at a lower neutral voltage. Due to faulty wiring in buildings, it is often found that the neutral line 16 is not really at ground potential, but is a little higher. It is conceivable that this can go as high as 10v. r.m.s. in a power distribution system, for example, in a 220v. 50 HZ supply system as employed in Europe. The components of system 11 can be chosen so that a fault condition is not indicated until the neutral voltage with respect to ground exceeds 10v. This, of course, will make the system insensitive to a lower ground impedance. The sensitivity of the system towards the ground impedance is also dependent on another very important parameter, namely, third wire leakage current. In the typical design presently to be described it was decided to keep the third wire leakage d.c. current to less than 10 microamperes. This limit appears to be an acceptably safe value for the apparatus with which the system is intended to be primarily used, namely, with an artificial kidney machine. For other uses, the system sensitivity for ground impedance monitoring can be improved by raising this limit.

The circuitry of the system 11 can be subdivided into five functional sections:

1. Power supply.
2. Logic circuit

3. Averaging and delay circuit.
4. Driver.
5. Oscillator.

The following is a detailed description of these functional sections as employed in the typical embodiment of FIG. 1.

1. Power Supply

The system 11 employs two d.c. supply circuits derived from a 220v., 50–60 Hz a.c. supply source fed through the wires 14, 16 and 18. A high voltage d.c. supply of 240v. is provided between a wire 23 and the wire 20, being employed to drive the oscillator circuitry including the neon lamp 22, and a low voltage of 12.0 0v. d.c. is provided between a wire 24 and the wire 20 and is used to drive the remainder of the circuitry. The d.c. supplies are of the half-wave rectifier type with smoothing filter capacitors across the output.

The components $R_1$, $R_2$, $CR_1$, $C_1$ and $R_3$ form the high voltage d.c. supply circuit. The resistors $R_1$ and $R_2$ divide the incoming line voltage in proportion to $$\frac{R_2}{R_1 + R_2}$$

The diode $CR_1$ rectifies the positive half cycle and blocks the negative half cycle. The resistor $R_3$ serves as the bleeder for the storage charge on the capacitor $C_1$. The resistor $R_1$ mainly limits the current in diode $CR_1$ and keeps it under its rated value.

The low voltage 12.0v. d.c. supply is formed by the components $R_4$, $R_5$, $CR_2$ and $C_2$. $R_4$ and $R_5$ form a voltage divider to bring the line voltage to about 24v. r.m.s. from the 220v. a.c. line. Diode $CR_2$ performs the half-wave rectification and capacitor $C_2$ smooths out the output.

2. Logic Circuit

The transistors $Q_1$, $Q_2$, $Q_3$, diodes $CR_3$, $CR_4$, and the resistors $R_7$, $R_8$, $R_9$ and $R_{10}$ form the logic circuit. The transistor $Q_2$ is used as a zener diode, which has a breaking voltage of 7.5–8.5v., at as low a current as 1.0 microampere.

If all the supply line connections are correct and no fault exists, then $Q_3$ remains off, allowing resistor $R_{15}$ to be shunted. If a fault is present, $Q_3$ is turned on, removing the shunt from resistor $R_{15}$. This is explained as follows, assuming the values shown in FIG. 1, with the power supply voltage given above:

a. With no existing fault:

Under these conditions, with the circuit values of FIG. 1, the d.c. low voltage $V_{dc}$ (12.0v.) at wire 24 applied through resistor $R_7$ and the base-emitter junction of transistor $Q_1$ provides base drive to the transistor. The base current $I_{bl}$ is given by:

$$I_{bl} = \frac{V_{dc} - V_{ebl}}{R_7}$$

where $V_{ebl}$ is the emitter-base voltage drop, in this case about 0.6v. Therefore, $$I_{bl} = \frac{12.0 - 0.6}{1.8 M} = 6.33 \, \mu a$$

This base current draws enough collector current to saturate transistor $Q_1$ and bring its collector voltage $V_{cl}$ to within 0.2v. of the ground potential (the potential of wire 21).

The collector current $I_{cl}$ drawn by transistor $Q_1$ is given by:

$$I_{cl} = \frac{V_{dc} - V_{cl}}{R_8} = \frac{12.0 - 0.2}{2.7 M} = 4.37 \, \mu a$$

The total d.c. current $I_{gl}$ entering ground wire 21 is given by:

$$I_{gl} = I_{bl} + I_{cl} = 10.7 \, \mu a$$

This leakage current $I_{gl}$ is strictly a function of the d.c. voltage $V_{dc}$ and the values of resistors $R_7$ and $R_8$.

With the collector of transistor $Q_1$ substantially at ground potential, the $Q_2$ zener cannot break and hence, transistor $Q_3$ cannot obtain base drive, which keeps $Q_3$ turned off.

b. Open Ground Fault (wire 18 open):

Under these conditions ground wire 21 presents an infinite impedance to the emitter of transistor $Q_1$ and the $Q_1$ base-emitter circuit cannot be forward biased; the $Q_1$ base-collector junction is free to conduct. There are now two current paths: (1) resistor $R_7$, $Q_1$ base-collector junction, $Q_2$ emitter-base junction, resistor $R_9$, and $Q_3$ base-emitter junction; and (2) resistor $R_8$, $Q_2$ zener, resistor $R_9$, and $Q_3$ base-emitter junction. The zener transistor $Q_2$ has a minimum breakdown voltage $V_z$ of 7.0v. at a current of 1.0 $\mu a$ or higher. The current $I_{be3}$ going into the $Q_3$ base-emitter junction will be given by:

$$I_{be3} = \frac{V_{dc} - V_z - V_{bcl} - V_{be3}}{R_7 + R_9} + \frac{V_{dc} - V_z - V_{be3}}{R_8 + R_9}$$

where $V_{bcl}$ is the $Q_1$ base-collector voltage drop (0.6v.), and $V_{be3}$ is the $Q_3$ base-emitter voltage drop (0.6v.). Therefore, $$I_{be3} = \frac{12.0 - 7.0 - 0.6 - 0.6}{1.8M + 0.1M} + \frac{12.0 - 7.0 - 0.6}{2.7M + 0.1M} = 3.57 \, \mu a$$

This $Q_3$ base current draws a collector current $I_{c3}$ to saturate $Q_3$ and bring its collector almost down to the potential of neutral wire 20 (within 0.2v.). The current $I_{c3}$ required for $Q_3$ to be saturated is given by:

$$I_{c3} = \frac{V_{dc} - 0.2}{R_{10}} = \frac{12.0 - 0.2}{56K} = 210 \, \mu a.$$

Transistor $Q_3$ has a $\beta = 100$, which allows a charge enough to draw 3.57 × 100 $\mu a$ = 357 $\mu a$.

Thus, under the open ground condition (line 18 open), transistor $Q_3$ is turned on, giving a logic fault signal indication at wire 25 (about 0.0v., as compared with normal 6.5v.).

c. Phase Reversal:

Under conditions where the power supply phase and neutral wires are reversed, the d.c. positive supply voltages (on wires 23 and 24, respectively) with respect to wire 20 are not affected because of the half-wave rectification. However, neutral wire 20 will now carry a sinusoidal a.c. voltage with respect to ground wire 21 of 50 Hz and 220v. r.m.s., or 440v. peak-to-peak. Since the low voltage d.c. supply voltage at wire 24 is still 12.0v. with respect to ground wire 21, the transistor $Q_1$ is turned on and its collector is substantially at the ground potential. The remainder of the logic circuit must be analyzed under two situations: (1) when neutral wire 20 is 220v. positive with respect to ground wire 21 during the positive half cycle, and (2) when neutral wire 20 is 220v. negative with respect to ground during the negative half cycle.

In the first situation, when neutral wire 20 goes through the positive excursion, the $Q_3$ base-emitter junction is reverse-biased and $Q_3$ cannot conduct. Diode $CR_4$ is forward biased and so is the $Q_2$ base-emitter junction. The current path now is from wire 20 through diode $CR_4$, resistor $R_9$, the $Q_2$ base-emitter junction, and the $Q_1$ collector-emitter junction to ground wire 21. The current in ground wire 21 during this half cycle will be $$\frac{220 - 0.6 - 0.6}{R_9} = \frac{218.8}{100K} = 2.2 \, ma.$$

During the negative half cycle the same current is drawn from wire 21, and thus the effective current in wire 21 remains unchanged.

During said negative half cycle the $Q_1$ collector is still at the ground voltage. The current path is now from the $Q_1$ collector through $Q_2$ zener, resistor $R_9$ and the $Q_3$ base-emitter junction. The current $I_{be3}$ drawn by the $Q_3$ base-emitter junction is given by:

$$I_{be3} = \frac{220 - 7.0 - 0.6}{100K} = 2.2 \, ma.$$

Since the negative half cycle ground current is slightly less than the positive half cycle ground current, it will be observed that the leakage current in wire 21 will increase slightly on phase reversal. An observed value was 12.0 $\mu$a, from 10 $\mu$a.

The function of resistor $R_9$ is to limit current during the phase-reversal operation. Thus it will be seen that transistor $Q_3$ is on every other half cycle in phase-reversal operation. For 50 Hz operation the period is 20 msec, hence $Q_3$ is on 10 msec and off 10 msec. The logic fault signal of 0.0 v. on wire 25 is obtained because of the delay circuit formed by capacitor $C_3$ and resistor $R_{10}$. This delay circuit has a time constant of $R_{10} \times C_3 = 56K \times 5\mu f$, or 280 msec. In order to trigger the driver stage a minimum voltage of 2.4v. is required on wire 25. With a 12v. supply, this means 20% of this line voltage, which requires 0.2 × the time constant value, or a time of 0.2 × 280 = 56 msec, to reach the required value of 2.4v. on the exponential capacitor charging curve, to fire the next stage. However, the time that is available is only 10 msec, which is insufficient, and hence the driver stage remains off, allowing the neon lamp oscillator to function. The diodes $CR_3$, $CR_4$ and $CR_6$ are for transistor protection under phase-reversal conditions.

d. Ground Impedance Exceeds a Definite Value:

It is apparent from the circuit shown in FIG. 1, that unless the $Q_1$ collector goes above 8.5v. the $Q_2$ zener will not conduct. This zener is employed in the circuit to increase immunity for the higher-than-normal neutral voltage. Since the leakage current in wire 21 is to be kept at a minimum, say, below 10 $\mu$a, the circuit will not show a fault until the ground impedance exceeds $$\frac{8.5}{10\mu a} = 850K.$$

If a higher value of this leakage is tolerable, this impedance value can be lowered.

The behavior of the circuit when the ground impedance exceeds this limit is straightforward. The transistor $Q_1$ is on, but its collector is at 8.5v. or more, which is enough for the $Q_2$ zener and $Q_3$ base current. $Q_2$ and $Q_3$ turn on, bringing the $Q_3$ collector to ground potential and disabling the driver stage, which removes the inhibit on the oscillator.

e. Neutral Voltage Exceeds a Definite Value:

The neutral line wire 20 is theoretically assumed to be at the ground potential (that of wire 21). However, due to faulty wiring in the building and loading on the lines, this neutral line voltage may go higher. The possibility exists, for example for a power distribution system in Europe, that this neutral line voltage may go up to 10.0v. r.m.s. higher than the ground potential.

Under these conditions, when the neutral wire 20 is going through a 10.0v. positive half cycle with $Q_1$ on, $Q_3$ is back-biased, and the conduction path is through $CR_4$, $R_9$ and the $Q_2$ emitter-base junction. Hence, $Q_3$ is off. During the negative half cycle, unless the voltage exceeds about 9.0v. and well beyond that, $Q_2$ will not zener and there will not be enough drive for $Q_3$. Once the threshold of about 9.5v. is reached, $Q_3$ will turn on every half cycle causing $C_3$ to discharge and since there will not be sufficient time for $C_3$ to charge to the trigger voltage of the driver stage, the driver transistors $Q_4$ and $Q_5$ will stay off, allowing the oscillator to function.

3. Averaging and Delay Circuit:

The resistors $R_{10}$, $R_{11}$ and the capacitor $C_3$ form this averaging and delay circuit. As will be apparent from the above description, the purpose of this circuit is to delay the triggering level for the driver stage when the neutral wire is undergoing higher amplitude sine wave excursions. At 50 Hz, the half cycle period is 10 msec, which is the available time for $C_3$ to charge. As above pointed out, the charging time constant is 280 msec. Since the trigger voltage is about 2.0v., which is about 16% for a 12.0v. supply, in order to reach that level about 0.2×280 msec, or 56 msec is required.

4. Driver Stage:

Resistor $R_{12}$, transistors $Q_4$ and $Q_5$, and diodes $CR_5$ and $CR_6$ comprise the driver circuitry. The operation of this circuit is as follows: when $Q_3$ is off, after about 56 msec, $Q_4$ and $Q_5$ obtain base drive through $R_{10}$, $R_{12}$, $CR_5$ and their base-emitter junctions, which allows them to turn on. Transistor $Q_5$ shorts the impedance $R_{15}$, keeping the neon lamp 22 illuminated. The current level is about 1.5 ma. If, for any reason, $Q_3$ comes on, the driver stage is disabled, which removes the short across $R_{15}$, allowing the oscillator to function and causing lamp 22 to provide a blinking action.

5. Oscillator Circuit:

The oscillator circuit is a standard R-C neon lamp oscillator. The high voltage d.c. supply of about 200v. from wire 23 is made available for the oscillator. If transistor $Q_5$ is on, resistor $R_{15}$ is shorted, and lamp 22 shows steady illumination once capacitor $C_4$ is charged. The breakdown voltage for neon lamp 22 is about 70.0v. The charging time constant is $C_4 \times (R_6 + R_{14})$, or 0.47 $\mu$f $(6.8K + 47K) = 25$ msec. However, when $Q_5$ is turned off, the charging time constant is $C_4$ ($R_{15} + R_{14} + R_6$)=.47$\mu$f(1$M$+47$K$+6.8$K$) or about 500 msec. The firing voltage for the neon lamp 22 is about 70v., which is about 35% of the available voltage. The time required to reach this will be about $0.4 \times 500$ msec = 200 msec. Since the capacitor $C_4$ is connected across lamp 22 in the upper leg of the circuit, the time required for firing will be about 500 msec $-200$ msec = 300 msec. Since the discharge time constant will also be the same, the "off" period of lamp 22 will also be about 300 msec.

Summarizing, it will be seen that with normal power line conditions, transistor $Q_3$ is off and an inhibit signal is placed on the driver circuit (12.0v. on the $Q_3$ collector) which turns on transistors $Q_4$ and $Q_5$ and shorts resistor $R_{15}$. This prevents oscillation and maintains neon lamp 22 steadily illuminated.

With (a) the "hot" power supply line connected to the equipment ground wire, (b) with the "hot" power supply line connected to the equipment neutral wire with the phase wire open, (c) with the phase wire open, or (d) with the neutral wire open, no power will be furnished to the neon lamp circuit, and the lamp 22 will remain dark.

With other power line faults, such as (a) open ground, (b) phase reversal, (c) excessively high ground impedance, or (d) high neutral voltage, transistor $Q_3$ will be on and the $Q_3$ collector will either be at ground potential (open ground or high ground impedance), or there will not be enough time to charge up capacitor $C_3$ sufficiently to trigger the driver circuit (phase reversal or high neutral voltage), and transistors $Q_4$ and $Q_5$ will be off, removing the short across resistor $R_{15}$ and thereby allowing oscillation and causing the lamp 22 to blink at a constant rate. Under these fault conditions, transistor $Q_1$ is on either at all times (open ground or excessively high ground impedance) or on a duty cycle basis (phase reversal or high neutral voltage).

From the above discussion, it will be seen that the system monitors most of the common power line faults. The main parameters of the fault monitoring are the (1) leakage current of the third wire 21, (2) ground impedance sensitivity, and (3) neutral voltage immunity. All three parameters are interdependent in this system.

In a typical system such as that illustrated in FIG. 1, the components employed were as follows:

| Component | Description or Value |
| --- | --- |
| Resistors $R_1$, $R_6$ | 6.8 K* |
| Resistors $R_2$, $R_4$ | 220 K |
| Resistor $R_3$ | 56 K |
| Resistor $R_5$ | 27 K |
| Resistors $R_7$, $R_{11}$ | 1.8 M* |
| Resistor $R_8$ | 2.7 M |
| Resistors $R_9$, $R_{12}$ | 100 K |
| Resistors $R_{10}$, $R_{13}$ | 56 K |
| Resistor $R_{14}$ | 47 K |
| Resistor $R_{15}$ | 1 M |
| Diodes $CR_1$ through $CR_6$ | Type 1N4004 S1 |
| Transistors $Q_1$, $Q_2$, $Q_3$, $Q_4$ | Type 2N3568 S1 NPN |
| Transistor $Q_5$ | Type 2N3440 S1 NPN |
| Capacitor $C_1$ | 10 µf, 450v. |
| Capacitor $C_2$ | 300 µf, 16v. |
| Capacitor $C_3$ | 5 µf, 16v. |
| Capacitor $C_4$ | 47 µf, 200v. |
| Neon Lamp 22 | Lecraft Type 41EN 2813 |

*K = 1,000 ohms, M = 1,000,000 ohms

Figure 3:
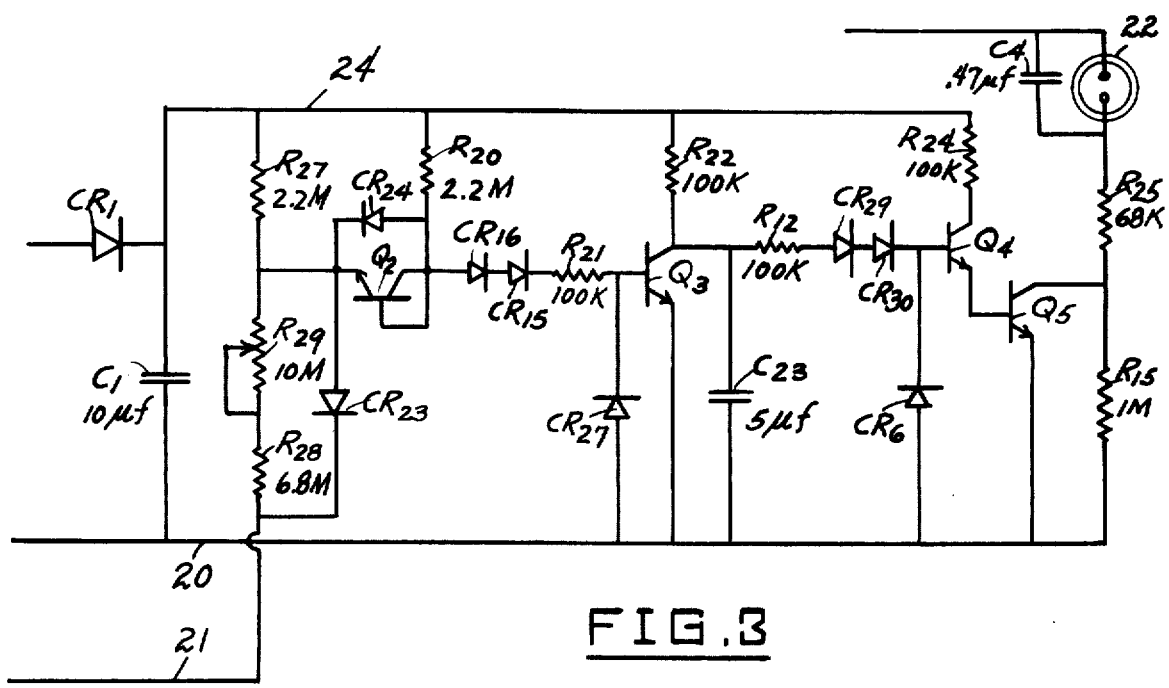
FIG. 3 is a partial wiring diagram showing a further modification of the power line fault indicator of the present invention.

FIG. 3 shows a modification of the invention having a mode of operation generally similar to that of FIG. 1, as follows:

a. With no existing fault:

Under these conditions the diode $CR_{23}$ shorts the resistor branch $R_{28}$, $R_{29}$. Resistors $R_{27}$ and $R_{20}$ admit current into diodes $CR_{23}$ and $CR_{24}$. The current flowing into ground wire 21 is via two paths:

1. $R_{27}$, $CR_{23}$ and (2) $R_{20}$, $CR_{24}$, $CR_{23}$. The current in path (1) is $$\frac{12.0 - 0.6}{2.2M} = 5.18 \, \mu a,$$

where the 0.6 value represents the voltage drop across $CR_{23}$. The current in path (2) is given by $$\frac{12.0 - 0.6 - 0.6}{2.2M} = 4.92 \, \mu a,$$

where each diode has a 0.6v. voltage drop. Hence, the total d.c. leakage current in wire 21 is 10.0 µa.

Since the diodes $CR_{23}$ and $CR_{24}$ will clamp the voltages across them to 0.6v. each, the junction of $CR_{24}$ and $CR_{16}$ will be at 1.2v. The biasing diodes $CR_{15}$ and $CR_{16}$ ensure that in order for transistor $Q_3$ to turn on, a minimum of 1.8 v. is required at the junction of $CR_{24}$ and $CR_{16}$. Thus, $Q_3$ stays off. The transistor $Q_2$ is used as a zener which has a very sharp breakdown at about 8.0v. at as low a current as 1.0 µa. When the ground wire 21 is properly connected to earth ground, $CR_{24}$ shorts the zener $Q_2$.

b. Open Ground:

Under these conditions, with an infinite impedance between ground wire 21 and earth ground (wire 20), the current paths through $CR_{24}$ and $CR_{23}$ are interrupted. Resistor $R_{20}$ now provides the base current to $Q_3$ through $CR_{16}$, $CR_{15}$ and $R_{21}$. The base current for transistor $Q_3$ will be given by:

$$\frac{12.0 - \text{the voltage drops across } CR_{15}, CR_{16} \text{ and } Q_3 \text{ base-emitter}}{R_{20} + R_{21}} =$$

$$\frac{12.0 - 0.6 - 0.6 - 0.6}{2.2M + 0.1M} = 4.43 \, \mu a.$$

Transistor $Q_3$ has a minimum $\beta$ of 100, hence this base current is capable of providing $100 \times 4.43 = 443$ µa of collector current. However, $Q_3$ saturates at a current equal to $$\frac{12.0 - Q_3 \text{ base-collector saturation voltage drop}}{R_{22}} =$$

$$\frac{12.0 - 0.2}{100K} = 118 \, \mu a.$$

Therefore, the available base drive is capable of saturating transistor $Q_3$, thus giving the logic fault signal for the subsequent circuitry.

c. Phase and Neutral Reversal:

Under these conditions wire 20 will be oscillating at 220v. r.m.s., 50 Hz sine wave with respect to ground wire 21. During the positive half cycle the junction of $CR_{24}$ and $CR_{16}$ will still be at 1.2v.; $Q_3$ base-emitter will be back-biased, $CR_{15}$ and $CR_{16}$ will be back-biased; no current will flow in this path, hence transistor $Q_3$ remains off. During the negative half cycle the current path will be from ground wire 21, $R_{28}$, $R_{29}$, $Q_2$ zener, $CR_{16}$, $CR_{15}$, $R_{21}$ and $Q_3$ base-emitter. The diodes $CR_{23}$, $CR_{24}$ and $CR_{27}$ are back-biased during this half cycle. The current can be shown to be 25.75 μa.

During the positive half cycle the ground current in wire 21 is the same as under normal correct wiring conditions, namely, 10.0 μa. Thus, it is seen that transistor $Q_3$ comes on every negative half cycle. When $Q_3$ comes on it discharges capacitor $C_{23}$, and during the positive half cycle when $Q_3$ is off, $C_{23}$ is allowed to recharge. The charging time constant for $R_{22}$–$C_{23}$ is 500 msec. The driver stage trigger voltage is about 2.4v. on $C_{23}$, which would require about 110 msec. Since the available time is only 10 msec, the trigger voltage is never reached and the driver stage remains disabled, allowing the oscillator to function.

d. Phase-Neutral Reversal and Open Ground:

Under these conditions, the open ground (condition b) aspect dominates, and transistor $Q_3$ is permanently on, disabling the driver stage.

e. Phase-Neutral-Ground Transposed by One Position:

For example, the normally "hot" line 14 is grounded the normally neutral line 16 is "hot", and the normally grounded line 18 is neutral. The high and low voltage power supplies will function and the situation is somewhat similar to phase-neutral reversal. The circuit behaves similarly to Phase and Neutral Reversal (condition c) and indicates the fault.

f. Ground Impedance Sensitivity:

From the circuit, in order for $Q_3$ to turn on, the junction of $CR_{24}$ and $CR_{16}$ must reach at least 1.8v. If an impedance is inserted in the ground wire, with the leakage current flowing through it the voltage at said junction is raised. When it is raised by 0.6v., $Q_3$ is ready to be turned on. Therefore, the ground impedance sensitivity would be $$\frac{0.6}{10\mu a} = 60K$$

In actual measurement this value was found to be higher because the base current has to flow through $R_{21}$, which raises the trigger threshold by 100K × 4.4 μa = 0.44v. Also, variations in the diode voltage drops from the nominal 0.6v. value may cause the trigger voltage to go up.

g. Neutral Voltage Immunity:

The neutral line wire 20, though assumed to be at ground potential, is always somewhat higher, due to uneven distributions and ground loops. This wire carries a sinusoidal voltage of line frequency. During the positive half cycle, $Q_3$ base-emitter is back-biased and $Q_3$ stays off. However, during the negative half cycle, if the amplitude exceeds the $Q_2$ zener and the intervening voltage-drops, $Q_3$ will turn on. The circuit will not show any fault until a specific high limit neutral voltage is reached, for example, 10.0v. r.m.s.

In the embodiment of FIG. 3, the resistor $R_{22}$ and the capacitor $C_{23}$ form the delay circuit. Because the time constant is about 500 msec, with $Q_3$ on, the time between alternate half cycles is only 10 msec, so that the delay circuit prevents the driver stage from firing when line 20 is undergoing excessive sine wave excursions. When $Q_3$ is turned off, the trigger voltage on $C_{23}$ will be reached in 100 msec. Therefore, when the power is turned on, this delay circuit will not cause significant delay if the connections are correct.

In the embodiment of FIG. 3, the driver circuit is formed by resistors $R_{12}$ and $R_{24}$, diodes $CR_{29}$, $CR_{30}$ and $CR_6$, and transistors $Q_4$ and $Q_5$. When $Q_3$ is off, resistors $R_{22}$ and $R_{12}$ provide the base drive for $Q_4$ and $Q_5$ and they turn on. When $Q_5$ is on, it short circuits resistor $R_{15}$ and inhibits the oscillator. When $Q_3$ is on it deprives $Q_4$ and $Q_5$ of base drive, turning them off and thus removing the inhibit on the oscillator.

The oscillator is a standard neon relaxation oscillator circuit. The neon lamp 22 requires about 120v. d.c. for breakdown and its sustaining voltage is about 70v. When $Q_5$ is on it short circuits $R_{15}$, thus changing the time constant of the circuit. With $R_{15}$ short circuited, the time constant is $C_4 \times (R_6 + R_{25})$ or 0.47 μf (68K + 6.8K) = approximately 35 msec. The lamp appears to give a steady indication because of its very small on-off period. However, when $Q_5$ is turned off, the charging and discharging time constants are about 500 msec, and the time to reach the breakdown voltage and then the extinguishing voltage is in each case about 250 msec, which shows up as a blinking indication.

Figure 2:
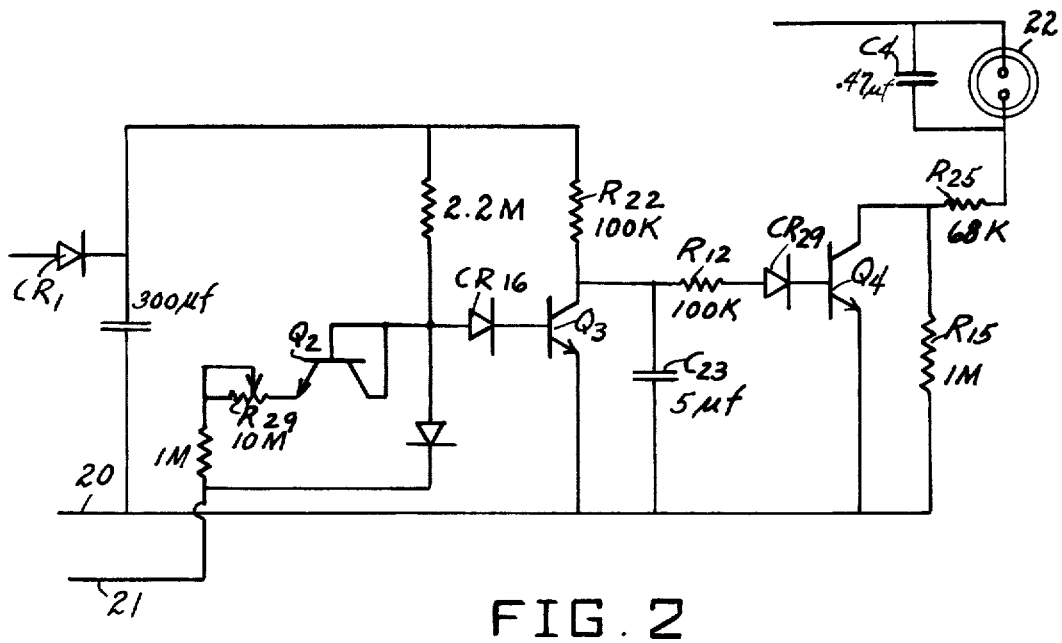
FIG. 2 is a partial wiring diagram showing a simplification of portions of the power line fault indicator of FIG. 1.

FIG. 2 is a further modification which somewhat reduces the number of components required and improves ground impedance sensitivity.

In both FIGS. 2 and 3, the neutral voltage immunity range can be controlled by the use of the variable resistor $R_{29}$.

It will be seen that in the various embodiments of the invention above described, switch means, which may be of the electronic type, such as transistor $Q_5$, or equivalent type, serves to control the operation of the neon lamp oscillator, and in the presence of a wiring fault condition in the power supply system the control circuit operatively connected between the ground conductor 21 and the base of transistor $Q_5$ causes the switch means to open and allow the oscillator to function. It will be further seen that a voltage divider circuit means is defined by $R_{10}$ or $R_{22}$, the control transistor $Q_3$ and capacitor $C_3$ or $C_{23}$ which is arranged normally to furnish an inhibit signal to render $Q_5$ conductive and to remove the inhibit signal in the presence of a power supply wiring fault condition; the capacitor $C_3$ or $C_{23}$ imposes a time delay in the triggering of the switch transistor $Q_5$. Also, it will be seen that in the various embodiments, a circuit means including a zener device ($Q_2$) connects the d.c. supply to the base of the control transistor $Q_3$, and that this zener device is rendered conductive in response to power supply wiring fault conditions.

While certain specific embodiments of a.c. power line fault indicating devices have been disclosed in the foregoing description it will be understood that various modifications within the spirit of the invention may occur to those skilled in the art. Therefore it is intended that no limitations be placed on the invention except as defined by the scope of the appended claims.

What is claimed is:

1. An a.c. power line fault indicating device comprising respective phase, neutral and ground conductors, an indicator circuit branch including a capacitor and a resistor connected in series and a discharge lamp connected across the capacitor to form an oscillator, circuit means including a rectifier connecting said indicator circuit branch across said phase and neutral conductors, switch means connected across said resistor, means to close said switch means to disable the oscillator when said phase, neutral and ground conductors are connected to corresponding supply terminals of a three-wire a.c. power supply system free of wiring faults, whereby to illuminate said discharge lamp steadily, and means opening said switch means responsive to the presence of a wiring fault condition in the power supply system, whereby to allow the oscillator to function and to cause periodic illumination of said discharge lamp, wherein the switch means comprises an electrically operated switch device and the means responsive to the presence of a wiring fault condition comprises a wiring fault-sensitive control circuit operatively connected between said ground conductor and said electrically operated switch device.

2. The fault indicating device of claim 1, and wherein the means responsive to the presence of a wiring fault condition includes means responsive to the presence of phase voltage between said neutral and ground conductors.

3. The fault indicating device of claim 1, and wherein the means responsive to the presence of a wiring fault condition includes means responsive to the presence of a relatively high impedance between said neutral and ground conductors.

4. The fault indicating device of claim 1, and wherein the means responsive to the presence of a wiring fault condition includes means responsive to the presence of a substantial voltage between said neutral and ground conductors.

5. The fault indicating device of claim 1, and wherein the means responsive to the presence of a wiring fault condition includes means responsive to leakage current in said ground conductor.

6. The fault indicating device of claim 1, and wherein said electrically operated switch device comprises a switch transistor having its collector and emitter connected to opposite terminals of the resistor, and wherein said control circuit is connected to the base of said transistor, and wherein the means to disable the oscillator comprises voltage divider circuit means in said control circuit arranged to furnish an inhibit signal to said base to render the transistor conductive in the absence of wiring fault conditions in the power supply system and arranged to substantially remove said inhibit signal in the presence of a power supply wiring fault condition.

7. The fault indicating device of claim 6, and wherein said voltage divider circuit means comprises first and second impedances connected in series, a control transistor connected across the second impedance, d.c. supply means connected to said voltage divider circuit means, circuit means connecting the junction of the impedances to said base, and means to turn on said control transistor responsive to the presence of a power supply wiring fault condition, said inhibit signal normally appearing across said second impedance.

8. The fault indicating device of claim 7, and wherein said second impedance includes a delay means connected across said control transistor to impose a time delay in the triggering of said switch transistor.

9. The fault indicating device of claim 8, and wherein said delay means comprises a capacitor connected across the control transistor.

10. The fault indicating device of claim 8, and circuit means responsive to the condition of the ground conductor to connect said d.c. supply means at times to the base of said control transistor.

11. The fault indicating device of claim 8, and circuit means including a zener device connecting said d.c. supply means to the base of said control transistor, and means responsive to a power supply wiring fault condition to render said zener device conductive.

12. In combination, an artificial kidney machine having respective phase, neutral and ground power input conductors adapted to be connected to corresponding terminals of a three-wire a.c. power supply system, an indicator circuit branch including a capacitor and a resistor connected in series and a discharge lamp connected across the capacitor, to form an oscillator, circuit means including a rectifier connecting said indicator circuit branch across said phase and neutral conductors, switch means connected across said resistor, means to close said switch means to disable the oscillator when said phase, neutral and ground conductors are connected to corresponding supply terminals of a three-wire a.c. power supply system free of wiring faults, whereby to illuminate said discharge lamp steadily, and means opening said switch means responsive to the presence of a wiring fault condition in the power supply system, whereby to allow the oscillator to function and to cause periodic illumination of said discharge lamp, wherein the switch means comprises an electrically operated switch device and the means responsive to the presence of a wiring fault condition comprises a wiring fault-sensitive control circuit operatively connected between said ground conductor and said electrically operated switch device.

13. The structural combination of claim 12, and wherein the means responsive to the presence of a wiring fault condition includes means responsive to leakage current in said ground conductor.

* * * * *